United States Patent
Park et al.

(10) Patent No.: US 9,521,694 B2
(45) Date of Patent: Dec. 13, 2016

(54) METHOD AND APPARATUS FOR INITIAL ACCESS DISTRIBUTION OVER WIRELESS LAN

(71) Applicant: LG ELECTRONICS INC., Seoul (KR)

(72) Inventors: Giwon Park, Anyang-si (KR); Kiseon Ryu, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 14/406,444

(22) PCT Filed: Jun. 18, 2013

(86) PCT No.: PCT/KR2013/005374
§ 371 (c)(1),
(2) Date: Dec. 8, 2014

(87) PCT Pub. No.: WO2013/191448
PCT Pub. Date: Dec. 27, 2013

(65) Prior Publication Data
US 2015/0139209 A1 May 21, 2015

Related U.S. Application Data

(60) Provisional application No. 61/660,821, filed on Jun. 18, 2012, provisional application No. 61/662,881, (Continued)

(51) Int. Cl.
*H04W 74/08* (2009.01)
*H04W 76/00* (2009.01)
(Continued)

(52) U.S. Cl.
CPC ......... *H04W 74/0875* (2013.01); *H04W 48/12* (2013.01); *H04W 74/08* (2013.01);
(Continued)

(58) Field of Classification Search
None
See application file for complete search history.

(56) References Cited

U.S. PATENT DOCUMENTS 8,526,464 B2 * 9/2013 McNew ............ H04W 74/0816
370/465
2005/0152373 A1 7/2005 Ali
(Continued)

FOREIGN PATENT DOCUMENTS

KR 10-2012-0037176 4/2012
WO 2012030852 3/2012

OTHER PUBLICATIONS

"An Enhanced Scheduling Algorithm for Qos OPtimization in 802.11e Based Networks" Azhaguramyaa, et al.; Global Journal of Computer Science and Technology; vol. 12 Issue 5; Mar. 2012.

*Primary Examiner* — Hassan Kizou
*Assistant Examiner* — Ashil Farahmand
(74) *Attorney, Agent, or Firm* — Dentons US LLP

(57) ABSTRACT

Disclosed are a method and an apparatus for initial access distribution over a wireless LAN. A method for an initial access by a station (STA) comprises: a step in which the STA receives a fast initial link setup (FILS) backoff parameter from an access point (AP); and a step in which the STA implements a backoff procedure by using the final FILS backoff parameter determined on the basis of the FILS backoff parameter and an access category of the data to be transmitted by the STA. Accordingly, the initial access of the STA can be distributed.

8 Claims, 19 Drawing Sheets

Related U.S. Application Data filed on Jun. 21, 2012, provisional application No. 61/667,421, filed on Jul. 3, 2012, provisional application No. 61/696,226, filed on Sep. 3, 2012, provisional application No. 61/696,811, filed on Sep. 5, 2012.

(51) Int. Cl.
*H04W 48/12* (2009.01)
*H04W 84/12* (2009.01)
*H04W 28/18* (2009.01)
*H04W 48/20* (2009.01)

(52) U.S. Cl.
CPC ............ *H04W 76/00* (2013.01); *H04W 28/18* (2013.01); *H04W 48/20* (2013.01); *H04W 84/12* (2013.01)

(56) References Cited

U.S. PATENT DOCUMENTS

| | | |
|---|---|---|
| 2012/0071192 A1 | 3/2012 | Li et al. |
| 2013/0235720 A1* | 9/2013 | Wang ................ H04W 28/0278 370/229 |

\* cited by examiner

FIG. 1
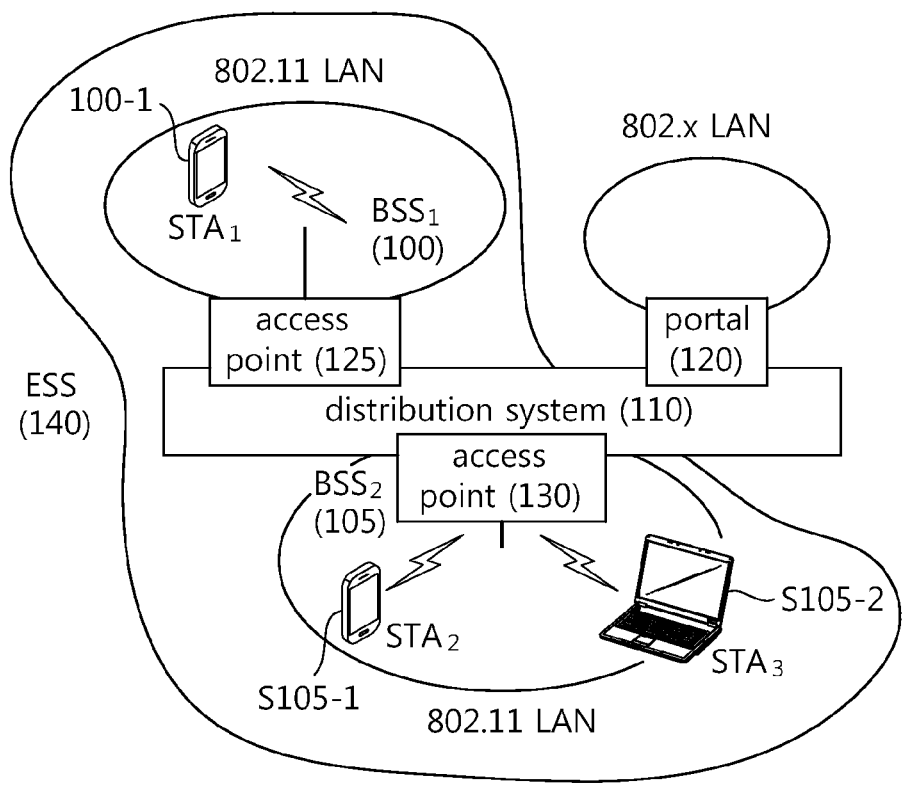
(A)
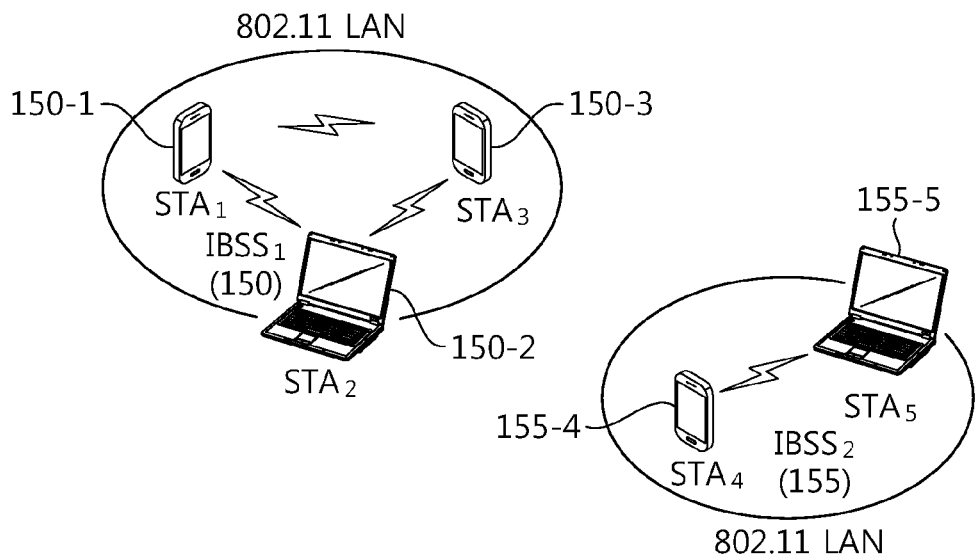
(B)

FIG. 6
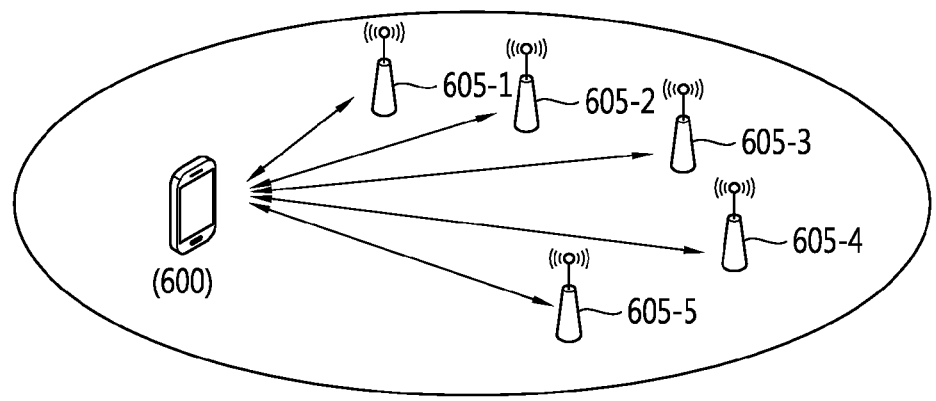
probe request frame (610)
(wildcard, SSID, wildcard BSSID)     (A)
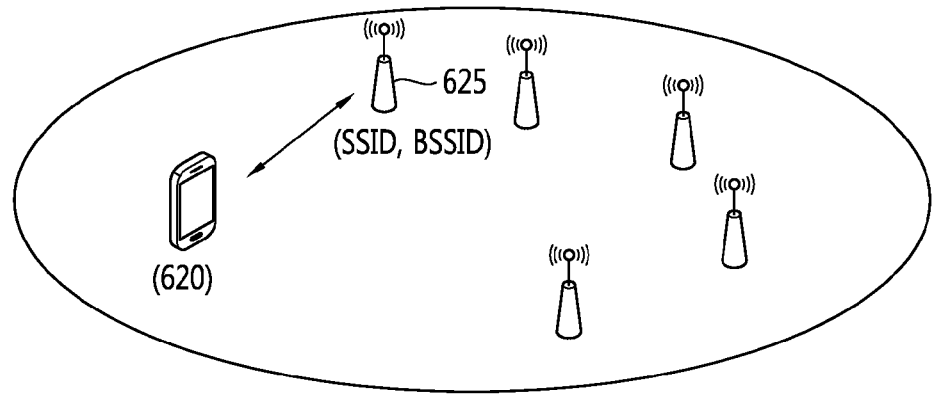
probe request frame(630)
(SSID, BSSID)     (B)
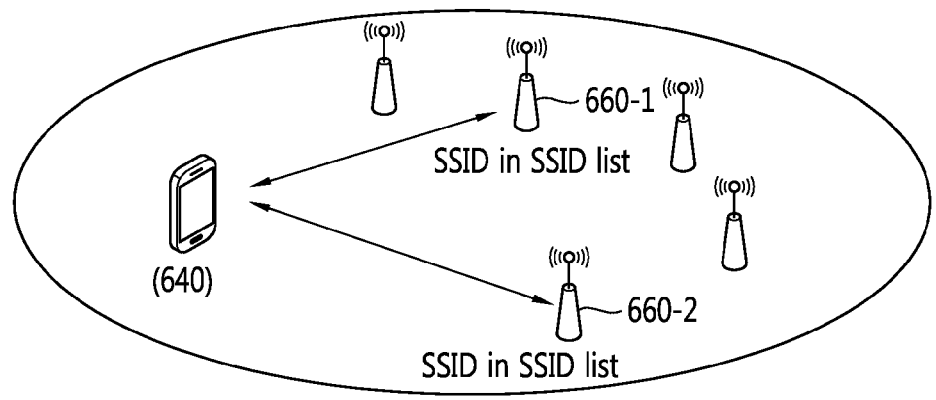
probe request frame (660)
(SSID, wildcard BSSID)     (C)

METHOD AND APPARATUS FOR INITIAL ACCESS DISTRIBUTION OVER WIRELESS LAN

This application is a 35 USC §371 National Stage entry of International Application No. PCT/KR2013/005374 filed on Jun. 18, 2013 and claims priority to U.S. Provisional Application No. 61/660,821, filed Jun. 18, 2012, U.S. Provisional Application No. 61/662,881, filed Jun. 21, 2012, U.S. Provisional Application No. 61/667,421, filed Jul. 3, 2012, U.S. Provisional Application No. 61/696,226, filed Sep. 3, 2012, and 61/696,811, filed Sep. 5, 2012, all of which are incorporated by reference in their entirety herein.

BACKGROUND OF THE INVENTION

Field of the Invention

The present invention relates to wireless LANs, and more specifically, a method and apparatus that perform access to a medium over a wireless LAN.

Related Art

"Recent wireless LAN technologies are evolving largely in three ways. Efforts to further increase transmission speed include IEEE (Institute of Electrical and Electronic Engineers) 802.11ac and IEEE 802.11ad as extensions to the existing WLAN evolution. IEEE 802.11ad is a wireless LAN technique that employs a 60 GHz band. Further, broad band wireless LAN utilizing a frequency band of less than 1 GHz is nowadays on the rise to enable transmission in a broader area than by the existing WLAN and such WLAN technologies include IEEE 802.11af utilizing a TVWS (TV White Space) band and IEEE 802.11ah utilizing a 900MHz band. These standards primarily target expansion of extended range Wi-Fi services as well as smart grid and wide-area sensor networks. Further, the conventional WLAN MAC (Medium Access Control) techniques suffer from the problem that the initial link setup time is significantly increased in some cases. Standardization of IEEE 802.11ai is actively going on to address such issue to thus enable quick access from an STA to an AP."

IEEE 802.11ai is directed to an MAC technique that deals with a rapid authentication procedure to substantially save the initial setup and association time of WLAN and its standardization activities have been started with a normal task group since January 2011. To enable a quick access procedure, the IEEE 802.11ai task group goes on discussion for simplified procedures in the fields of AP discovery, network discovery, TSF (Time Synchronization Function) synchronization, authentication & association, merging with higher layers. Among others, procedure merging utilizing piggyback of DHCP (Dynamic Host Configuration Protocol)), optimization of full EAP (Extensible Authentication Protocol) using concurrent IP, and efficient selective AP (Access Point) scanning are actively under discussion.

SUMMARY OF THE INVENTION

An object of the present invention is to provide an initial access method.

Another object of the present invention is to provide an apparatus that performs an initial access method.

To achieve the above objects, according to an aspect of the present invention, an initial access method by an STA (station) may comprise receiving, by the STA, an FILS (Fast Initial Link Setup) backoff parameter from an AP (Access Point) and performing, by the STA, a backoff procedure using a final FILS backoff parameter determined based on the FILS backoff parameter and an access category of data to be transmitted by the STA, wherein the FILS backoff parameter may include information for determining a size of a CW (Contention Window) for each of the access category and information for determining an AIFSN (Arbitration Inter-Frame Space Number), and wherein the access category may be information for indicating the type of traffic data of the STA allowed by the AP for the initial access.

To achieve the above objects, according to another aspect of the present invention, an STA (station) of a wireless LAN system may include a processor, wherein the processor may be implemented to receive an FILS (Fast Initial Link Setup) backoff parameter from an AP (Access Point) by the STA and to perform, by the STA, a backoff procedure using a final FILS backoff parameter determined based on the FILS backoff parameter and an access category of data to be transmitted by the STA, wherein the FILS backoff parameter may include information for determining a size of a CW (Contention Window) for each of the access categories and information for determining an AIFSN (Arbitration Inter-Frame Space Number), and wherein the access category may be information for indicating the type of traffic data of the STA allowed by the AP for the initial access.

When a number of STAs perform initial access to an AP, the STAs performing the initial access may be distributed.

BRIEF DESCRIPTION OF THE DRAWINGS

FIGS. 1(A) and 1(B) are concept views illustrating the structure of a wireless local area network (WLAN).

FIGS. 6(A), 6(B), and 6(C) are concept views illustrating a probe request frame transmission method.

DESCRIPTION OF EXEMPLARY
EMBODIMENTS

FIG. 1 is a concept view illustrating the structure of a wireless local area network (WLAN).

FIG. 1(A) shows the structure of the IEEE (institute of electrical and electronic engineers) 802.11 infrastructure network.

Referring to FIG. 1(A), the WLAN system may include one or more basic service sets (BSSs, 100 and 105). The BSSs 100 and 105 are sets of APs (Access Points) and STAs (stations), such as AP 125 and STA1 100-1, which may successfully sync with each other to perform communication, and the BSSs 100 and 105 do not mean specific areas. The BSS 105 may include one AP 130 and one or more STAs 105-1 and 105-2 connectible to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in FIG. 1(A), a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

FIG. 1(B) is a concept view illustrating an independent BSS.

Referring to FIG. 1(B), an independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
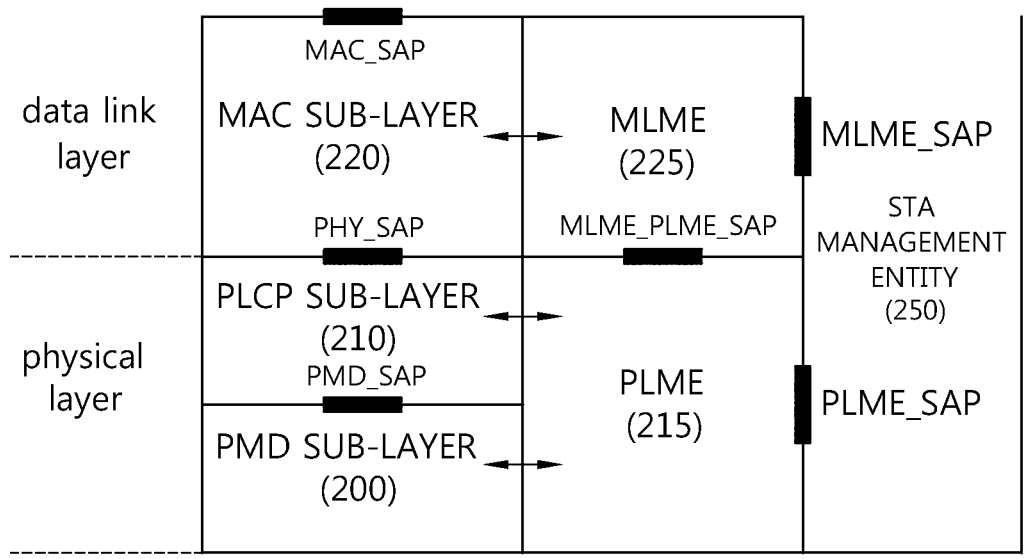
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include a management entity.

The management entity of the MAC sub-layer 220 is denoted an MLME (MAC layer management entity, 225), and the management entity of the physical layer is denoted a PLME (PHY layer management entity, 215). Such manag~ agement entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. At this time, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
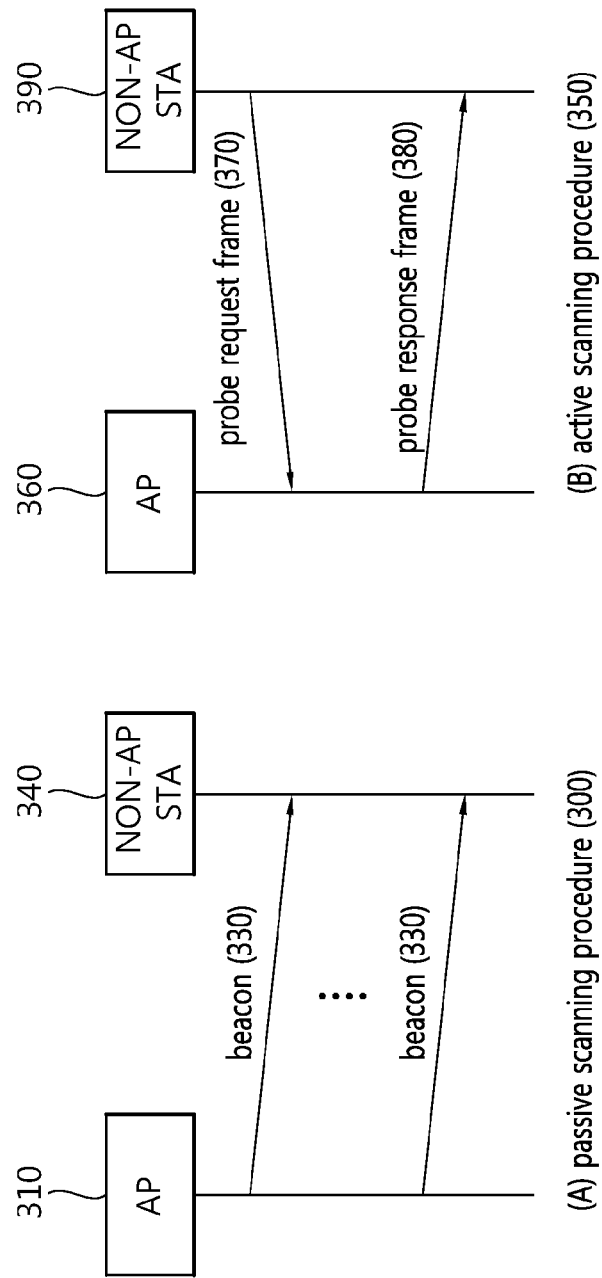
FIGS. 3(A) and 3(B) are concept views illustrating a scanning method in a WLAN.

FIG. 3 is a concept view illustrating a scanning method in a WLAN.

Referring to FIG. 3, scanning methods may be divided into passive scanning 300 and active scanning 350.

Referring to FIG. 3(A), the passive scanning 300 may be performed by a beacon frame 330 that is periodically broadcast from the AP 300. The AP 300 over the wireless LAN broadcasts a beacon frame 330 to a non-AP STA 340 at every particular period (e.g., every 100 msec). The beacon frame 330 may contain information on a current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without requiring the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' Ch. 8.3.3.2 Beacon Frame, as disclosed in November 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Referring to FIG. 3(B), the active scanning 350 refers to a method in which the non-AP STA 390 leads scanning by transmitting a probe request frame 370 to the AP 360.

The AP 360 may wait a random time after receiving the probe request frame 370 from the non-AP STA 390 to prevent frame collision and may then transmit a probe response frame 380, which includes network information, to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.1.

After the scanning is done, the AP and the STA may perform an authentication and association process.

Figure 4:
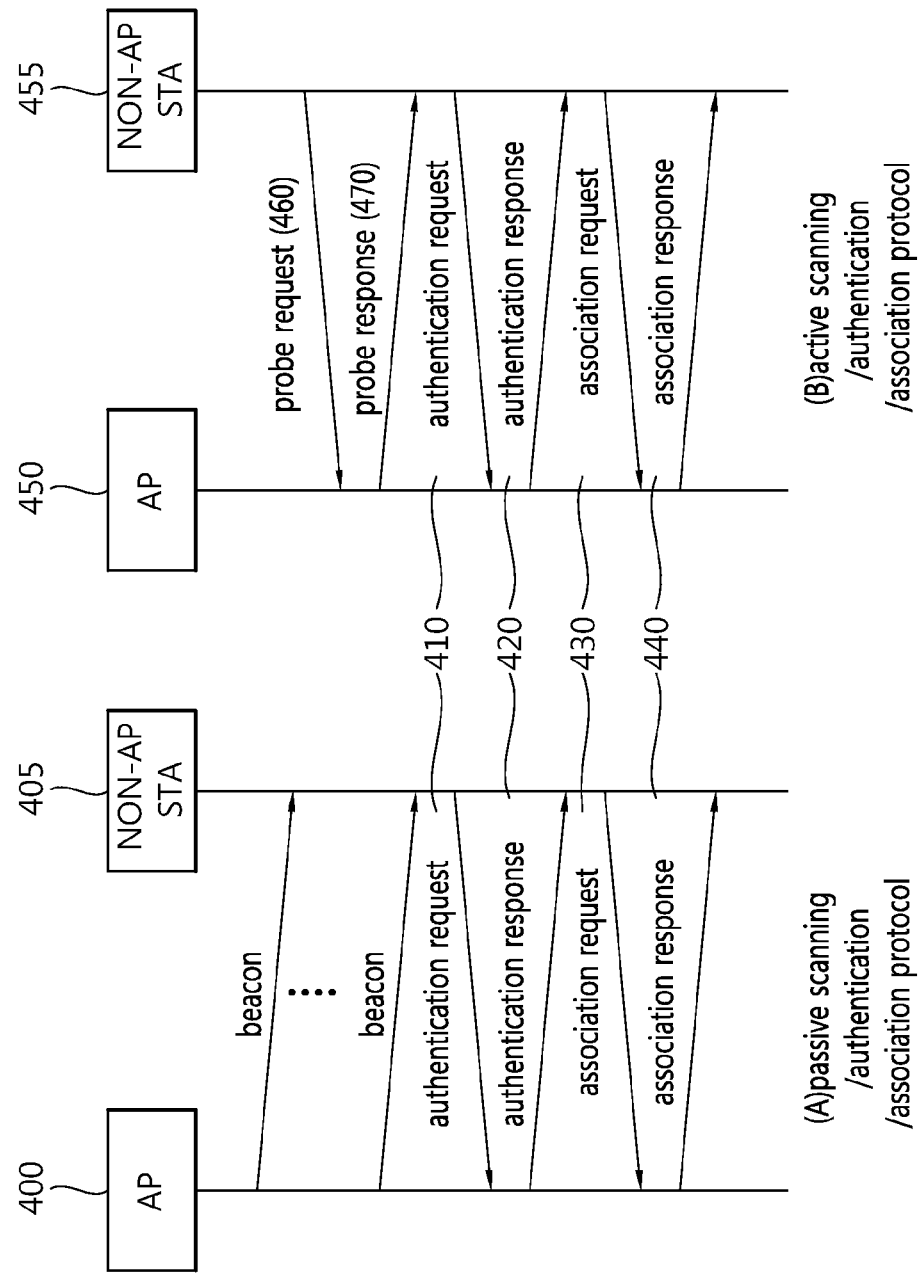
FIGS. 4(A) and 4(B) are concept views illustrating an authentication and association process after scanning between an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. FIG. 4(A) is a concept view illustrating an authentication and association process after passive scanning, and FIG. 4(B) is a concept view illustrating an authentication and association after active scanning.

The authentication and association process may be likewise performed by exchanging an authentication request frame 410/authentication response frame 420 and an association request frame 330/association response frame 440 between the APs 400 and 450 and the non-AP STAs 405 and 455 regardless of whether the scanning scheme used is active scanning or passive scanning.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information regarding the capability of the non-AP STAs 405 and 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
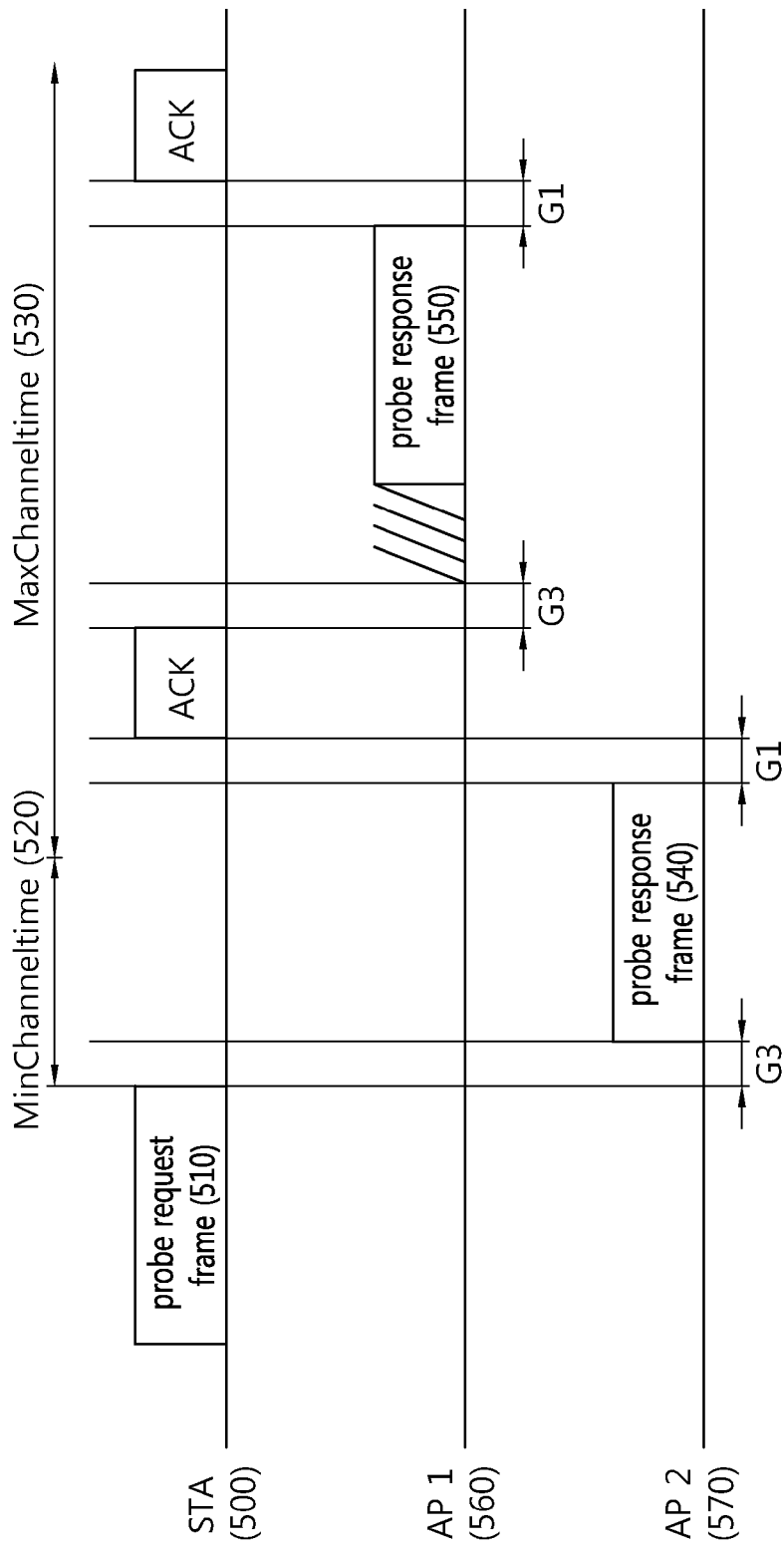
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received, to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until the minimum channel time 520, the STA 500 shifts scanning channels to perform scanning on other channel. In case the STA 500 receives the probe response frame 550 until the minimum channel time 520, it may process the received probe response frames 550 and 550 after waiting until the maximum channel time 530.

The STA 500 may detect PHY-CCA.indication primitive until the probe timer reaches the minimum channel time 520 and may determine whether other frame (for example, probe response frames 550 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN.request primitive is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
| --- | --- |
| BSSType | Determine whether infrastructure BSS, IBSS MBSS(mesh basic service set), or all are included in the scan |
| BSSID | Identifies a specific or wildcard BSSID |
| SSID | Specifies the desired SSID or the wildcard SSID |
| ScanType | Indicates either active or passive scanning |

TABLE 1-continued

| name | description |
| --- | --- |
| ProbeDelay | Delay(in microseconds) to be used prior to transmitting a probe request frame during active scanning |
| ChannelList | Specifies a list of channels that are examined when scanning for a BSS |
| MinChannelTime | The minimum time(in TU) to spend on each channel when scanning |
| MaxChannelTime | The maximum time(in TU) to spend on each channel when scanning |
| RequirementInforamtion | This element is optionally present if dot11RadioMeasurementActivated is true and is placed in a probe request frame to request that the responding STA include the requested information in the probe response frame |
| SSID List | One or more SSID element that are optionally present when dot11MgmtOptionSSIDListActivated is true |
| ChannelUsage | Specifies request types for the ChannelUsage request |
| AccessNetworkType | Specifies a desired specific access networktype or the wild card access network type. This field is present when dot11InterworkingSeviceActivated is true |
| HESSID | Specifies the desired specific HESSID network identifier or the wildcard network identifier. This field is present when dot11InterworkingServiceActivated is true |
| Mesh ID | Only present if BSS Type = MESH or BSSType = ANY_BSS. Specifies the desired Mesh ID or wildcard Mesh ID |
| RequestParameters | The parameter define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added depend on the vendor |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

FIG. 6 is a concept view illustrating a probe request frame transmission method.

FIG. 6 discloses methods of broadcasting, multicasting, and unicasting probe request frames from an STA.

FIG. 6(A) shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send probe response frames to the STA 600 in response to the received probe request frame.

In case the APs 606-1, 606-2, 606-3, 606-4, and 606-6 that have received the broadcast probe request frame 610 send the probe response frames to the STA 600 in response to the received probe request frame 610 within a predetermined time, the problem may occur that the STA 600 should simultaneously receive and process too many probe response frames.

FIG. 6(B) shows a method in which the STA 620 unicasts the probe request frame 630.

Referring to FIG. 6(B), in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

FIG. 6(C) shows a method in which the STA 640 multicasts the probe request frame 660.

Referring to FIG. 6(C), the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

Hereinafter, the radio access scheme used in 802.11 is disclosed.

Basically, the MAC layer may utilize a DCF (Distributed Coordination Function) as a method for sharing a radio medium by a plurality of STAs. The DCF is based on CSMA/CA (Carrier Sensing Multiple Access with Collision Avoidance). Optionally, the MAC layer defines a method for sharing a medium between STAs based on RTS (Request To Send)/CTS (Clear To Send). The details of the DCF are described below.

Figure 7:
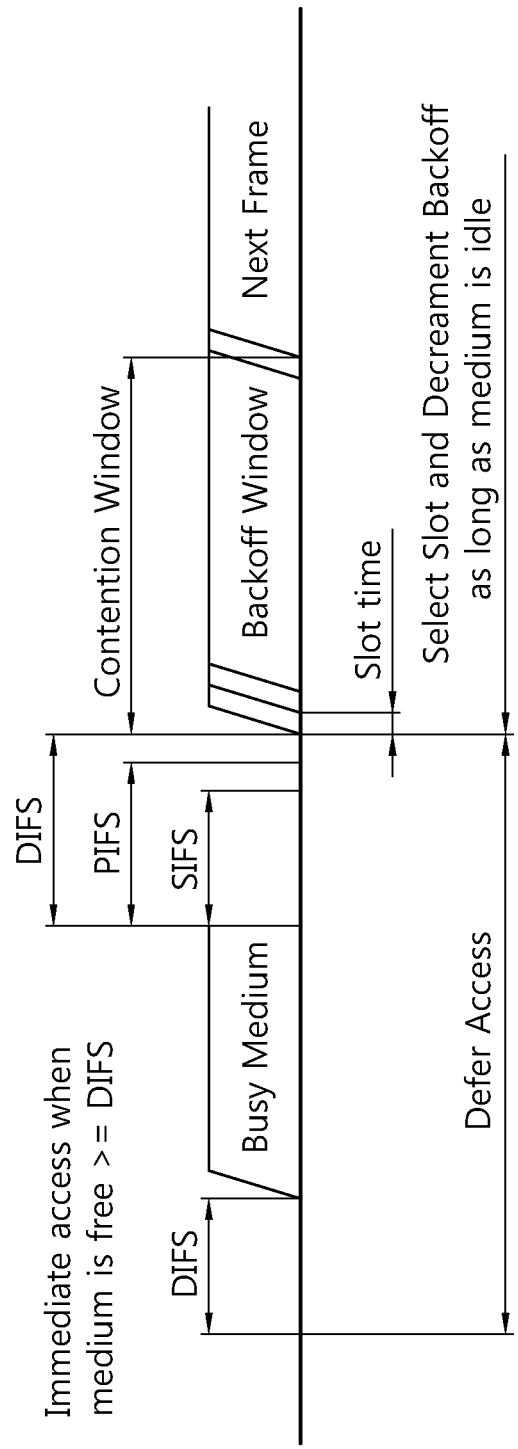
FIG. 7 is a concept view illustrating a DCF access process.

FIG. 7 is a concept view illustrating a DCF access process.

Generally, when an operation is conducted under the DCF access environment, if a medium is not used for a DIFS period or more (i.e., if idle), an STA may transmit an immediate MPDU (MAC Protocol Data Unit). In case the medium is determined to be in use by a carrier sensing mechanism, the STA may determine the size of a CW (Contention Window) by a random backoff algorithm and may perform a backoff procedure. In order to perform the backoff procedure, the STA sets up the CW and selects some time slot. This is called a backoff time. Among others, an STA having the shortest backoff time may access the medium, and the other STAs may stop the remaining backoff time and wait until the transmitting terminal completes the transmission. After the frame transmission of the STA is complete, the other STAs conduct contention over the remaining backoff time to obtain the medium.

In other words, in case the STA gains access to a channel using the DCF, the STA may detect the channel state for a predetermined time. Specifically, the STA, in case the channel remains idle during DIFS( ) attempts transmission after a random backoff time. Such DCF-based transmission scheme plays a role to avoid a plurality of STAs from simultaneously performing transmission, thus preventing collision.

The random backoff time is a time period during which the channel waits before a frame is transmitted after waiting a predetermined time (for example, DIFS), and the random backoff time may be defined as in the following equation:

<Equation 1>

$$\text{Backoff time} = \text{Random}(\ ) \times \text{Slot Time} \quad (1)$$

Figure 8:
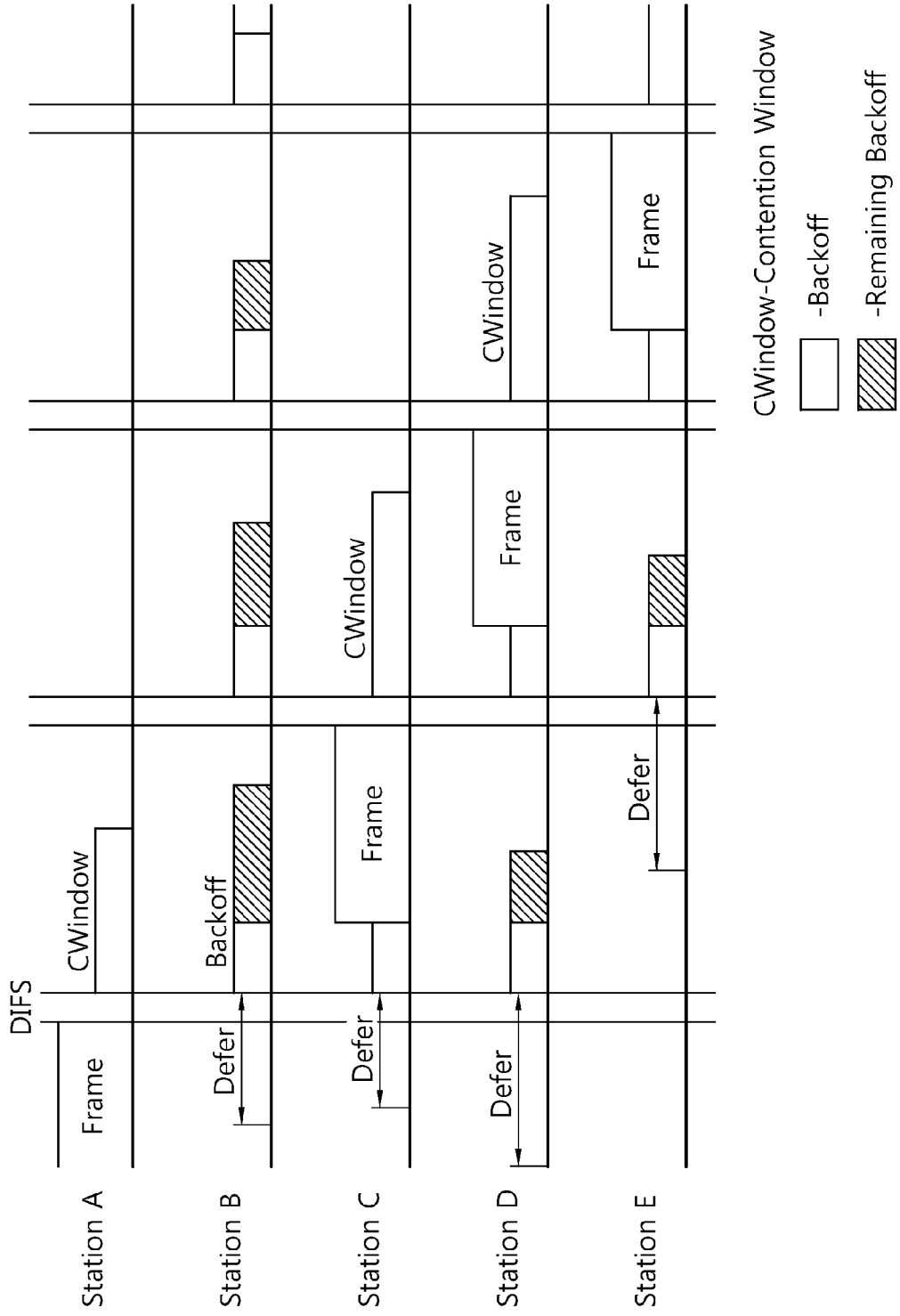
FIG. 8 is a concept view illustrating a backoff procedure of a plurality of STAs.

- Random( )=an integer between 0 and CW
- CW is an integer between CWmin and CWmax FIG. 8 is a concept view illustrating a backoff procedure of a plurality of STAs.

Referring to FIG. 8, a backoff slot may occur after a medium is determined to be idle for a DIFS period. If no activity of the medium is detected, the STA may reduce the backoff time based on aSlotTime. In case the medium is determined to be in use for the backoff slot, the STA might not reduce the backoff time. The frame transmission of the STA may be initiated whenever a set backoff timer is 0.

Further, the DCF transmission scheme includes an RTS/CTS access mode in which control frames (RTS, CTS) are exchanged before a data frame is transmitted to pre-occupy a channel. Such scheme may reduce channel waste by replacing a collision that may occur upon transmission of a data frame with a collision by a relatively short control frame.

As another method for sharing a radio medium by a plurality of STAs at the MAC layer, a PCF (Point Coordination Function) may be defined. The above-described DCF is based on the CSMA/CA scheme and is thus not able to guarantee real-time transmission of data transmitted between an STA and an AP. In contrast, the PCF may be used as a method for providing QoS (Quality Of Service) upon real-time data transmission. The PCF, also known as a non-contentious transmission service, may be used alternately with a DCF-type contention-based service, rather than exclusively using the entire medium transmission period. In the PCF, a point coordinator implemented in the AP of the BSS may control the right for each STA to be able to occupy the medium using a polling scheme. The PCF may be given a priority over the DCF by setting the PIFS, which is an IFS (Inter-Frame Space) in the PCF, to be smaller than the DIFS, which is an IFS of the DCF. The IFS denotes an interval between frames, and the IFS may be used to set a priority in which an STA accesses the medium. The IFS may be specifically defined as follows.

Figure 9:
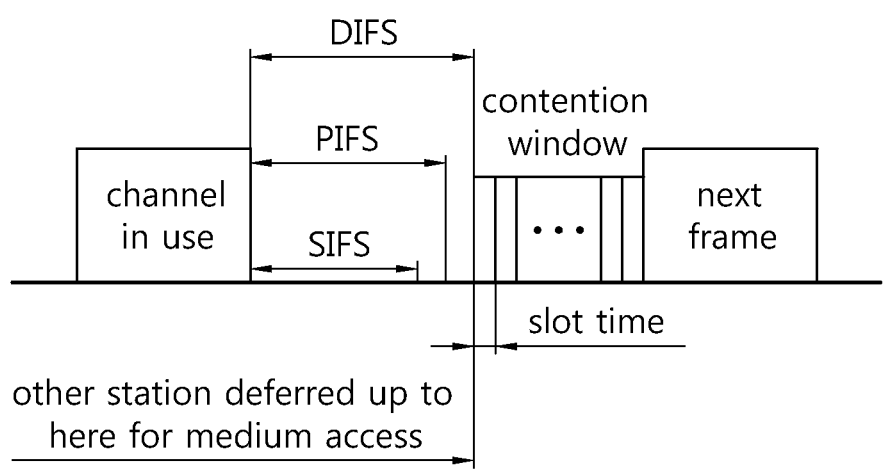
FIG. 9 is a concept view illustrating a frame interval.

FIG. 9 is a concept view illustrating a frame interval.

Referring to FIG. 9, the interval between two frames may be referred to as an IFS. An STA may determine whether a channel is being used for a time period of the IFS as defined in the standards, using a carrier sensing scheme. The MAC layer using the DCF defines a plurality of IFSs. The priority of an STA occupying a radio medium may be determined by an IFS. Inter-frame intervals depending on types of IFSs are as follow:

(1) SIFS (Short Inter Frame Symbol): used upon RTS/CTS, ACK frame transmission. Highest priority (2) PIFS (PCF IFS): used upon PCF frame transmission (3) DIFS (DCF FIS): used upon DCF frame transmission (4) EIFS (Extended IFS): used only when frame transmission error occurs. Not fixed interval In case the DCF is used for a plurality of STAs to share a radio medium at the MAC layer, various problems may arise. For example, when the DCF is used, if a plurality of STAs simultaneously conduct initial access to an AP, collision frequently occurs between the plurality of STAs. Further, the DCF lacks the concept of transmission priority and is not thus able to guarantee QoS (Quality Of Service) for traffic data transmitted from an STA. To address such issues, 802.11e defines a new coordination function, HCF (Hybrid Coordination Function), to enhance the channel access capability of the existing DCF and HCF. The HCF defines two channel access schemes, HCCA (HCF Controlled Channel Access) and EDCA (Enhanced Distributed Channel Access), similar to those defined in 802.11 MAC.

The EDCA and HCCA defines traffic categories that are transmission priorities, and the EDCA and HCCA may determine priorities at which channel access is conducted. In other words, the EDCA and HCCA may determine channel access priorities depending on types of traffic data by mutually defining a CW and an IFS according to the category of traffic data transmitted from an STA.

For example, in case traffic data is an email, the data may be allocated to a low priority class. As another example, in case traffic data is a voice communication through a wireless LAN, channel access may be conducted, with the traffic data allocated to a high priority class.

Upon use of the EDCA, traffic data with a higher priority would have relatively more chance to be transmitted as compared with traffic data with a lower priority. Further, an STA having higher-priority traffic may have a shorter average wait time than an STA having lower-priority traffic before transmitting packets. A transmission priority in the EDCA may be implemented by allocating a shorter CW to higher-priority traffic rather than lower-priority traffic while assigning an AIFS (Arbitration inter-Frame Space) that is shorter than the IFS that is a frame interval defined in the DCF. Further, the EDCA enables an STA to access a channel without contention during a period that is referred to as a TXOP (Transmit Opportunity). An STA may transmit as many packets as possible during a predetermined TXOP period within a range not exceeding the maximum period of the TXOP. If one frame is too long to be transmitted during one TXOP, the frame may be cut into smaller frames that may be then transmitted. Use of the TXOP may mitigate the situation that an STA with a low transmission rate excessively occupies a channel, which is a problem of the existing 802.11 DCF MAC.

Figure 10:
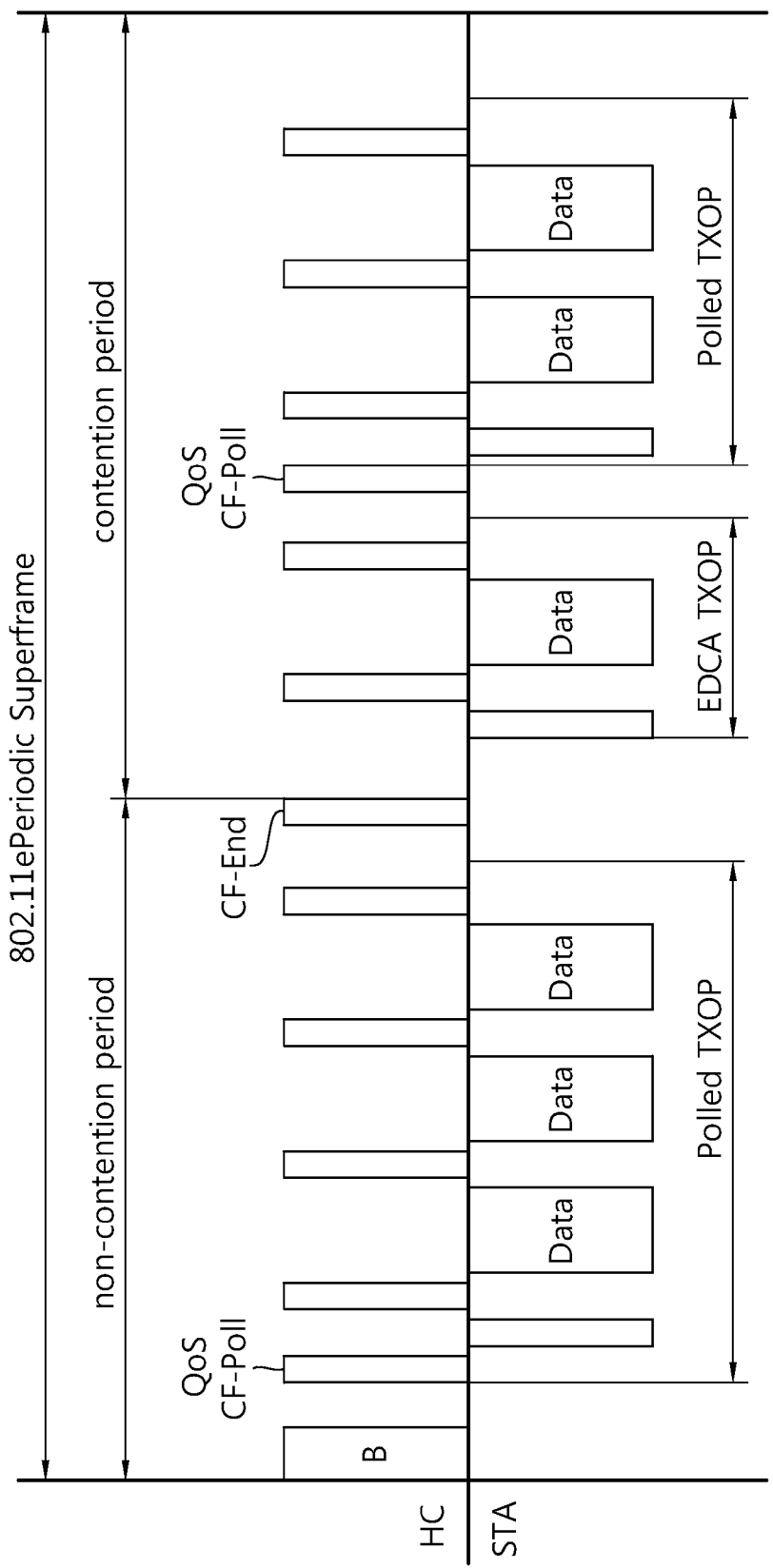
FIG. 10 is a concept view illustrating a method of obtaining a TXOP by an STA.

FIG. 10 is a concept view illustrating a method of obtaining a TXOP by an STA.

Referring to FIG. 10, an STA attending QoS transmission may use two channel access schemes such as EDCA and HCCA to obtain a TXOP by which the STA may transmit traffic for a predetermined traffic. The TXOP may be obtained by succeeding in an EDCA contention or by receiving a QoS CF-Poll frame from an access point. The TXOP obtained by succeeding in an EDCA contention is called an EDCA TXOP, and a TXOP obtained by receiving a QoS CF-Poll frame from an AP is called a Polled TXOP. As such, use of the concept "TXOP" enables an STA to be given a predetermined time during which the STA may transmit a frame or enables the transmission time of the STA to be forcedly constrained. The transmission start time and maximum transmission time of a TXOP may be determined by an AP. The EDCA TXOP may be notified to an STA by a beacon frame, and the Polled TXOP may be notified to an STA by a QoS CF-Poll frame.

The EDCA and HCCA which are channel access schemes defined in the HCF are hereinafter described in greater detail.

(1) EDCA

In the EDCA scheme, channel access may be conducted with eight user priorities defined for traffic data. For priority-based QoS data frame transmission, the EDCA defines four ACs (Access Categories: AC_BK, AC_BE, AC_VI, and AC_VO). The EDCA may, based on the ACs, map the traffic data arriving at the MAC layer with different user priorities as in the following <Table 2>.

Table 2 exemplifies the mapping between the user priorities and the ACs.

TABLE 2

| Priority | User Priority | AC(access-category) |
| --- | --- | --- |
| Low | 1 | AC_BK |
|  | 2 | AC_BK |
|  | 0 | AC_BE |
|  | 3 | AC_VI |
|  | 4 | AC_VI |
|  | 5 | AC_VI |
|  | 6 | AC_VO |
| High | 7 | AV_VO |

A transmission queue and an AC parameter may be defined for each AC. The differences in transmission priority between the ACs may be implemented based on the AC parameter values set to be different from each other. The EDCA may use AIFS[AC], CWmin[AC], and CWmax[AC] instead of DIFS, CWmin, and CWmax, respectively, which are parameters used in the DCF in the backoff procedure for transmitting the frames belonging to the AC. The parameters used in the backoff procedure for each AC may be carried over a beacon frame from an AP to each STA. As AIFS[AC] and CWmin[AC] decrease, a higher priority is given, and accordingly, the channel access delay shortens, thus allowing for use of more bands in a given traffic environment.

In case a collision occurs between the STAs while the STA transmits a frame, an EDCA backoff procedure of generating a new backoff counter is similar to the existing DCF backoff procedure, and differentiated backoff procedures for each AC may be performed based on different EDCA parameters. The EDCA parameters is becoming a critical means to differentiate channel access of various user priorities of traffic. A proper configuration of the EDCA parameter value including per-AC parameters may increase the transmission effect according to the priority of traffic while optimizing the network performance. Accordingly, an AP should conduct the overall management and adjustment function for the EDCA parameters to ensure that all of the STA attending the network may evenly access the medium.

Figure 11:
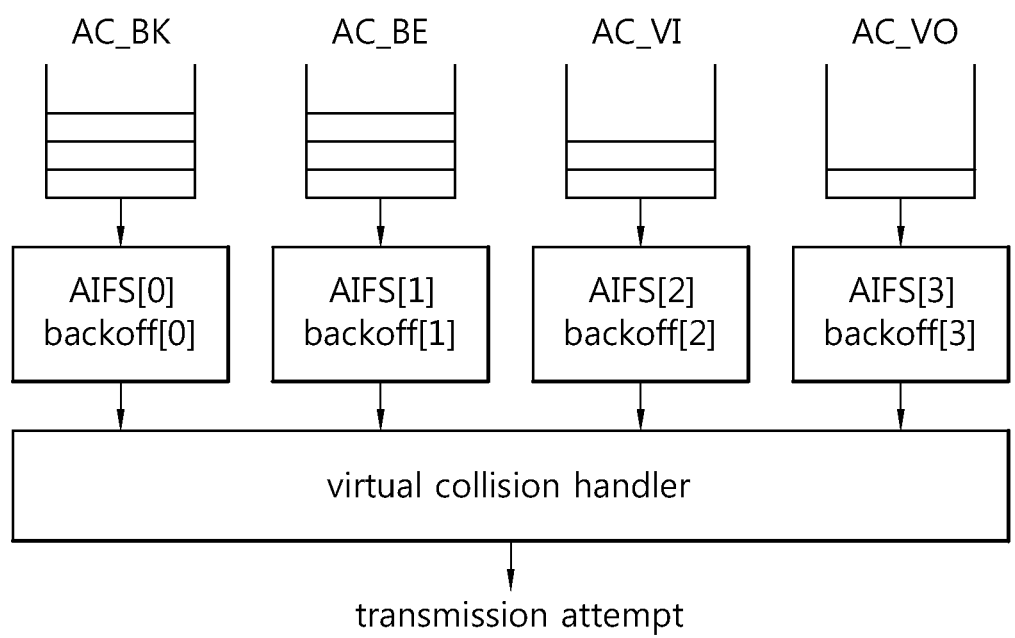
FIG. 11 is a concept view illustrating an EDCA channel reference model.

FIG. 11 is a concept view illustrating an EDCA channel reference model.

Referring to FIG. 11, the transmission queue for each of the four ACs defined in 802.11e MAC may play a role as an individual EDCA contention entity for radio medium access in one STA. One AC may retain an independent backoff counter with its own AIFS value. If there are one or more ACs that have simultaneously finished backoff, the collision between the ACs may be adjusted by a virtual collision handler. A frame is first transmitted to an AC having the highest priority, and the other ACs renew their backoff counters by increasing the contentious window values.

The start of a TXOP occurs upon accessing a channel according to the EDCA rules. If obtaining an EDCA TXOP when two or more frames stack in one AC, the EDCA MAC may attempt to transmit a number of frames. If an STA has already sent one frame and the STA may transmit a next frame in the same AC within the remaining TXOP time and receive an ACK thereto, the STA attempts transmission of the frame after an SIFS time interval. A TXOP constraint value may be transferred from the AP to the STA. In case the size of a data frame to be transmitted is in excess of the TXOP constraint value, the STA may fragment the frame into a number of smaller frames, and the STA may transmit the smaller frames within a range not exceeding the TXOP constraint value.

Figure 12:
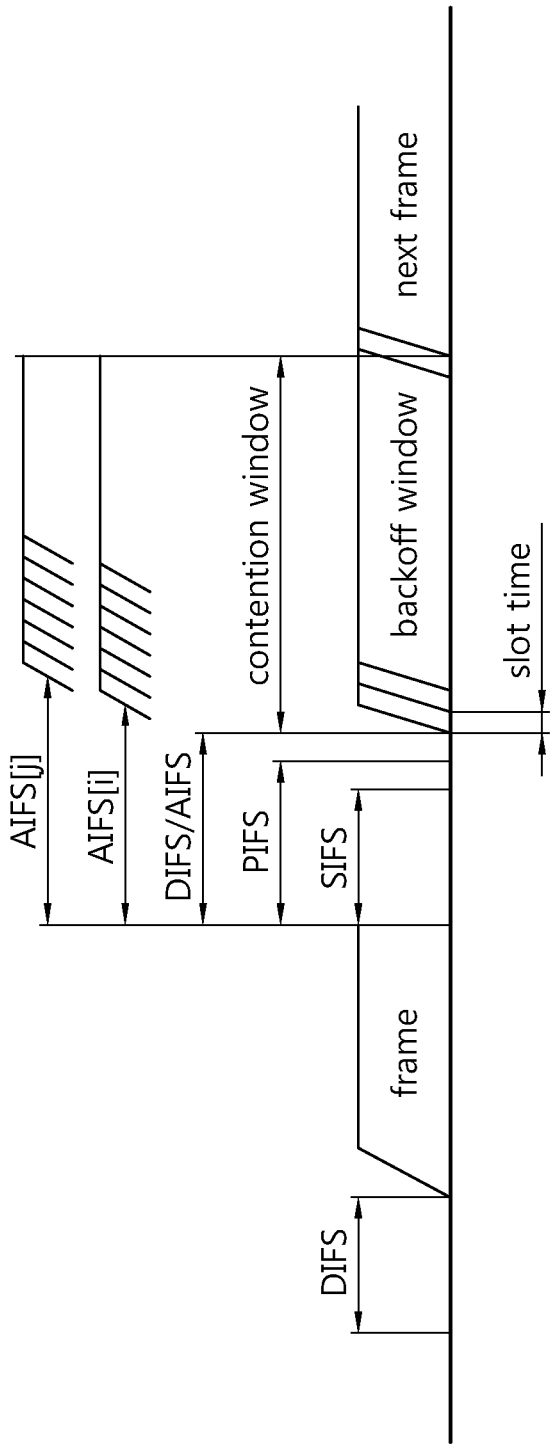
FIG. 12 is a concept view illustrating a backoff procedure of an EDCA.

FIG. 12 is a concept view illustrating a backoff procedure of an EDCA.

Referring to FIG. 12, each traffic data transmitted from an STA has a priority, and a backoff procedure may be conducted based on a contentious EDCA scheme. For example, the priorities respectively assigned to the traffics, as set forth above in Table 2, may be separated into eight, for example. As described above, one STA has different output queues depending on priorities, and each output queue is operated according to the EDCA rules. Each output queue may transmit traffic data using different AIFSs (Arbitration Interframe Spaces) according to each priority instead of the conventionally used DIFSs (DCF Interframe Spaces). Further, in case STAs are supposed to transmit traffics having different priorities at the same time, a traffic having a higher priority is transmitted earlier than the others, preventing collision in the terminal.

A backoff occurs under the following situations. A backoff is used when the frames transmitted from terminals cause collision and thus re-transmission is needed. To initiate a backoff, a terminal sets any backoff time in its backoff timer using Equation 2 below:

$$T_b[i] = \text{Random}(i) \times \text{SlotTime} \qquad \text{<Equation 2>}$$

Here, Random(i) is a function that generates any integer between 0 and CW[i] using a uniform distribution. CW[i] is a contention window between the minimum contention window CWmin[i] and the maximum contention window CWmax[i], and i is a traffic priority. At every collision, a new contention window CWnew[i] is computed using the following Equation 3 including a previous window CWold[i]:

$$CW_{new}[i]=((CW_{old}[i]+1)\times PF)-1 \quad \text{<Equation 3>}$$

Here, PF is computed according to the procedure defined in the IEEE 802.11e standard. CWmin[i], AIFS[i], and PF value may be transmitted from the AP using a QoS parameter set element that is a management frame.

(2) HCCA

The HCCA protocol uses an HC (Hyper Coordinator) that is positioned in an AP for centralized management on radio medium access. Since the HC performs integrated and centralized management on the radio medium, contention over radio medium access between STAs may be reduced, and exchange between data frames may be left in a short transmission delay time (SIFS), thus increasing network efficiency.

The HC controls transmission delay and scheduling by defining, in a parameter, a QoS characteristic for a particular traffic required by an application service to support QoS. Prior to the transmission of the parameterized QoS traffic, the HC establishes a virtual connection that is referred to as a traffic stream. The traffic stream may correspond to each of uplink from STA to AP, downlink from AP to STA, or direct link from STA to STA. In order to configure a traffic stream between an AP and an STA, QoS demand parameters such as delay time and traffic characteristics such as frame size and average transmission speed are exchanged through a mutual negotiation process.

In case the HC transmits a QoS CF-Poll frame to an STA, a TXOP constraint value that is a service provision time allowed to the STA is included in the QoS control field. In other words, the HC controls allocation of a medium access time using the TXOP. The TXOP constraint value is determined by a TSPEC. The TSPEC is requested by a station, and an AP determines whether to accept or decline the request for the TSPEC depending on network circumstances.

Once a traffic stream is configured, the HC provides contracted QoS by allocating a radio band required for the configured traffic stream between the AP and the STA. At a non-contention period of the HCCA, the HC has a right to control the medium, and if required, even at a contention period, the HC obtains a right to control the medium by transmitting a QoS CF-Poll frame after as long a delay time as the PIFS.

Figure 13:
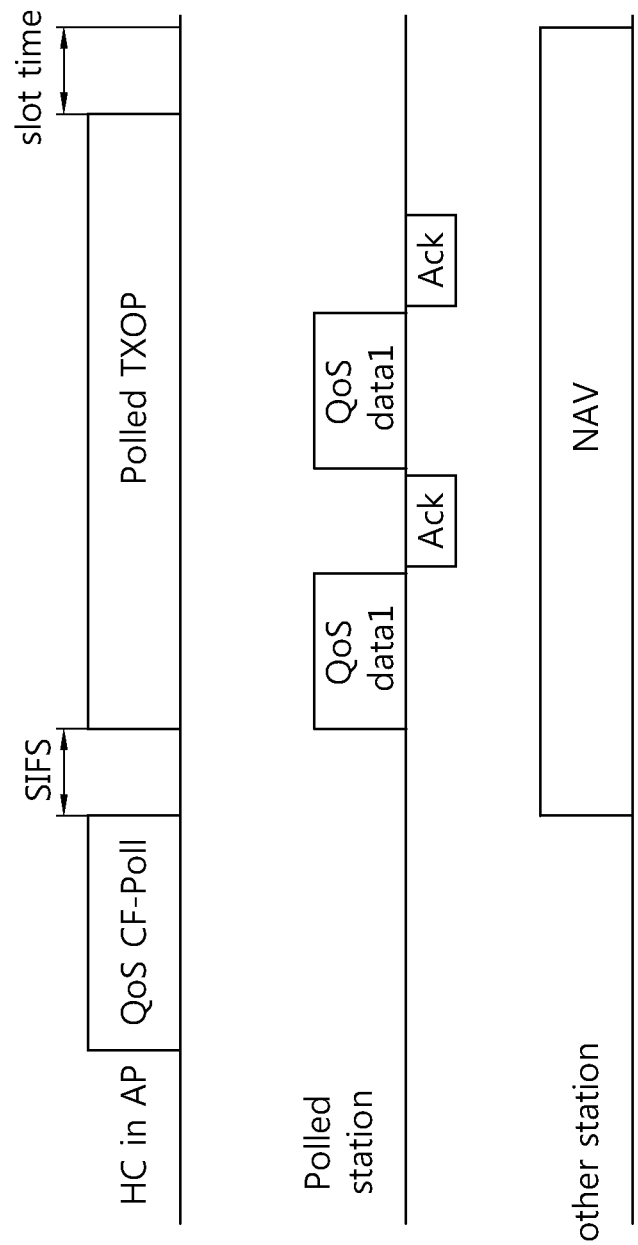
FIG. 13 is a concept view illustrating polled TXOP timings.

FIG. 13 is a concept view illustrating polled TXOP timings.

Referring to FIG. 13, a polled STA possessing a TXOP receives a QoS CF-Poll frame to have a right for channel access for as long a time as the TXOP constraint value designated in the QoS CF-Poll frame, and the polled STA transmits several frames. In this case, other STAs also configure their own NAVs by summing the TXOP time and a predetermined time after the reception of the QoS CF-Poll frame that does not apply to the STAs, and for the time, the STAs do not conduct contention over channel access.

Resultantly, the HC needs to schedule proper transmission of a QoS CF-Poll frame to satisfy contracted QoS requirements. Since a radio medium has various channel conditions depending on times and locations, creating an efficient scheduling algorithm is critical in supporting QoS. An excellent scheduling algorithm may enhance the capability of a radio network by allowing for more traffic streams without violating the QoS contract.

Hereinafter, a method of distributing a number of terminals to perform initial access when the terminals conduct initial access to an AP according to an embodiment of the present invention is disclosed. For example, there may be a number of APs that intend to access a particular AP in a subway station, concert or train station. In the existing backoff procedure, the terminal performs the backoff procedure based on the same backoff parameters regardless of the terminal's AC. Further, the existing backoff procedure of terminal is performed based on the same backoff parameter irrespective of whether the data communicated between the STA and the AP is sensitive or insensitive to a delay.

According to an embodiment of the present invention, a method is disclosed in which a backoff parameter conducting backoff based on information regarding the AC of traffic data communicated between the STA and the AP and/or information regarding whether the STA transmits and receives traffic data sensitive to a delay is adjusted to allow a plurality of STAs to perform the backoff procedure based on different backoff parameters from each other.

The following Table 3 represents backoff parameters that an STA uses when initially accessing an AP according to an embodiment of the present invention. The backoff parameters disclosed in Table 3 may be changed to exemplary values to represent setting different backoff parameters depending on ACs.

TABLE 3

| AC | CWmin | CWmax | AIFSN | TXOP Limit |
|---|---|---|---|---|
| Background | aCWmin | aCWmax | 9 | 0 |
| Best Effort | aCWmin | aCWmax | 6 | 0 |
| Video | (ACWmin + 1)/ 2 − 1 | aCWmin | 3 | 0 |
| Voice | (aCWmin + 1)/ 4 − 1 | (aCWmin + 1)/ 2 − 1 | 2 | 0 |

CWmin may indicate the minimum size of a CW corresponding to the unit of a slot time (aslot time). CWmax may indicate the maximum size of a CW corresponding to the unit of a slot time (aslot time). CWmin and CWmax, respectively, may be the minimum value and maximum value of a CW used by an STA when the STA performs backoff to access the AP. As CWmin and CWmax are decreased, the STA may have a higher priority to access a medium when performing a backoff procedure.

AIFSN (AIFS number) may contain information on the number of slots that should be deterred after an SIFS period before the STA performs the backoff procedure or transmission. The STA, when determining that the medium is idle during a period corresponding to the AIFS based on carrier sensing, may perform the backoff procedure or may transmit a frame. As the time corresponding to the AIFS is decreased, the STA may have a higher priority in accessing the radio medium.

TXOP limit may contain information regarding a period during which the STA may transmit data after obtaining a TXOP. In other words, TXOP limit may contain information regarding a time that may be used by the STA in case the STA accesses the radio medium. TXOP being '0' may indicate that the STA may transmit, to a current TXOP, e.g., a frame corresponding to a single MSDU (MAC service data unit), MMPDU (MAC management protocol data unit), A-MSDU (aggregated-MSDU), A-MPDU (aggregated-MPDU), or PS-Poll, a frame related to requested ACK information, RTS, and/or CTS, a frame for beamforming and link adaptation, and a frame including a block ACK.

CWmin, CWmax, AIFSN, and TXOP limit shown in Table 3 are exemplary types of backoff parameters that are varied depending on the classifications of data communicated between the STA and the AP. In other words, according to an embodiment of the present invention, a backoff parameter varied depending on the priority or AC of data may be at least one parameter of CWmin, CWmax, AIFSN, and TXOP limit. Further, the backoff parameter may be a set of other parameters including CWmin, CWmax, AIFSN, and TXOP limit. Hereinafter, the backoff parameter varied depending on the AC or priority of data is referred to as an FILS backoff parameter. For ease of description, the description primarily focuses on the FILS backoff parameter varying depending on ACs.

The information on the FILS backoff parameter defined according to an AC may be previously set and known between the AP and the STA or the information may be variable parameter information transmitted from the AP to the STA. For example, the AP may include the information on the FILS backoff parameter in an initial access frame (for example, a beacon frame, FILS beacon frame, probe response frame, and/or unsolicited probe response frame) and the AP may transmit the same to the STA. The STA may determine an FILS backoff parameter to be used depending on the AC and/or priority corresponding to the STA and the STA may perform a backoff procedure based on the determined FILS backoff parameter.

Referring to Table 3, the STA may determine a priority or AC (Access Class or Access Category) depending on the characteristics of traffic data to be transmitted and the STA may map a backoff parameter according to the same. In Table 3, CWmin, CWmax, and AIFSN may be varied. The AC may allow the STA to access the AP in the order of Voice, Video, Best Effort, and Background.

Figure 14:
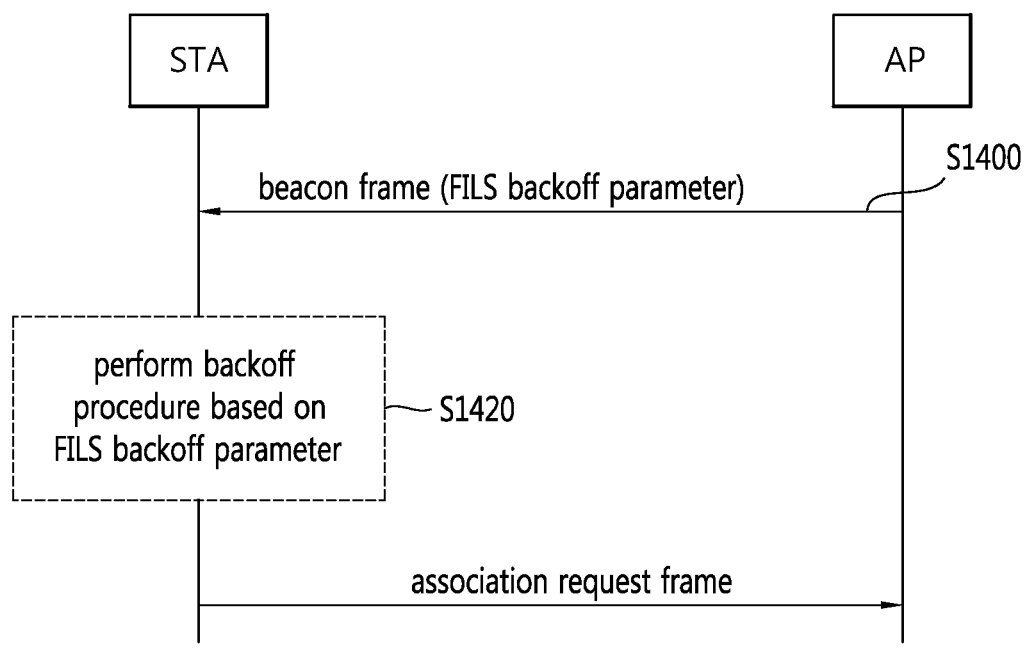
FIG. 14 is a concept view illustrating a method of transmitting an FILS backoff parameter by an AP according to an embodiment of the present invention.

FIG. 14 is a concept view illustrating a method of transmitting an FILS backoff parameter by an AP according to an embodiment of the present invention.

Referring to FIG. 14, the AP may include an FILS backoff parameter in a frame for initial access and the AP may transmit the same to the STA (step S1400).

The AP may utilize information measured by the AP and/or information that is generated and transmitted from the STA to the AP to determine an FILS backoff parameter.

In order to determine an FILS backoff parameter, the AP may periodically measure BSS average access delay values and the AP may transmit a FILS backoff parameter reflecting the BSS load and access procedure congestion to the STA. The FILS backoff parameter may be included in a frame used for initial access, such as an FILS beacon frame, a measurement pilot frame, a normal beacon frame, a probe response frame, and an unsolicited probe response frame.

Further, the AP may receive a report regarding information for determining an FILS backoff parameter from the STA, reflect the corresponding value to periodically or aperiodically vary the FILS backoff parameter, and transmit the FILS backoff parameter to the STA. The FILS backoff parameter may be included in a frame, such as an FILS beacon frame, a measurement pilot frame, a normal beacon frame, a probe response frame, and an unsolicited probe response frame, and the same may be transmitted.

The information for determining an FILS backoff parameter may include 1) information on the terminal's AC or UP, 2) backoff retry count, 3) packet retransmission count, and 4) latest backoff interval.

Further, the above-listed information for determining an FILS backoff parameter may also be used as information for controlling the terminal's access to the medium. In other words, when determining that the BSS load reaches the maximum capacity (Max capacity) based on the above-mentioned information for determining an FILS backoff parameter, the AP may bar all the terminals from access. As another embodiment, separate access barring may be conducted according to ACs and/or UPs.

The STA may perform a backoff procedure based on the FILS backoff parameter information transmitted from the AP (step S1420).

The STA may perform a backoff procedure based on the received FILS backoff parameter information.

Figure 15:
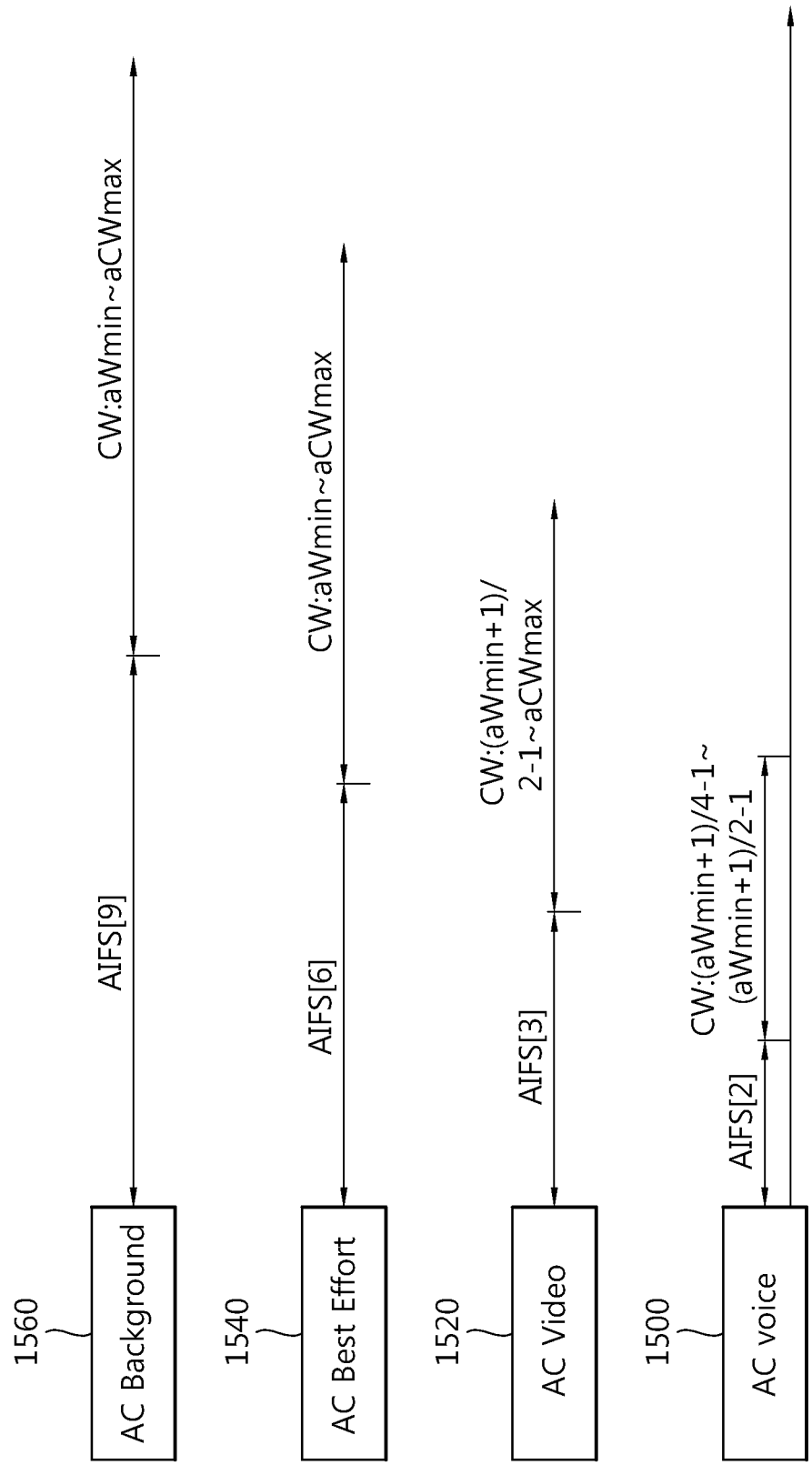
FIG. 15 is a concept view illustrating a backoff procedure according to an embodiment of the present invention.

FIG. 15 is a concept view illustrating a backoff procedure according to an embodiment of the present invention.

FIG. 15 discloses a method of performing another backoff procedure on the AC in the case described above in connection with Table 3.

(1) In case AC is Voice (1500), 2 may be selected as AIFSN. CW may be determined in a range from CWmin that is (aCWmin+1)/4−1 and to CWmax that is (aCWmin+1)/2−1.

(2) In case AC is Video (1520), 3 may be selected as AIFSN. CW may be determined in a range from CWmin that is (aCWmin+1)/2−1 and to CWmax that is aCWmin.

(3) In case AC is best effort (1540), 6 may be selected as AIFSN. CW may be determined in a range from CWmin that is aCWmin and to CWmax that is aCWmax.

(4) In case AC is background (1560), 9 may be selected as AIFSN. CW may be determined in a range from CWmin that is aCWmin and to CWmax that is aCWmin.

Referring to FIG. 15, since the AIFSN value and the CW size decrease in order of Voice, Video, best effort, and background, the STA may rapidly access the medium according to the ACs of traffic data transmitted from the STA.

According to another embodiment of the present invention, legacy STAs and FILS terminals (802.11ai-based STAs) performing FILS may be distinguished from each other to specify a terminal performing access during a specific time period, thereby distributing the STA's access. Further, a terminal to perform initial access among the FILS terminals performing FILS may be indicated by the above-described access distribution procedure. In order to perform such indication, an FILS access distribution indication parameter may be newly defined.

In order to indicate whether the STA is to perform an access distribution-based backoff procedure, i.e., a backoff procedure by an FILS backoff parameter, the AP may transmit an FILS access distribution indication parameter to the STA.

In other words, the STA may determine based on the received FILS access distribution indication parameter whether to perform an access distribution-based backoff procedure or an existing normal backoff procedure upon access to a radio medium. The AP may transmit, to the STA, an initial access frame (e.g., an FILS beacon frame, a measurement pilot frame, a normal beacon frame, a probe response frame, and an unsolicited probe response frame including the FILS access distribution indication parameter.

The following Table 4 represents a radio medium access method by a terminal.

TABLE 4

| Information | Note |
|---|---|
| FILS Access Distribution Indication | Indicate a terminal whether to perform access distribution when the terminal accesses AP<br>0: does not perform the access distribution<br>1: perform the access distribution |
| If (FILS Access Distribution Indication==1){<br>FILS Backoff Parameter<br>} | |

Referring to Table 4, the terminal that has received an FILS access distribution indication parameter may access the AP using a backoff procedure using the FILS backoff parameter only when the FILS access distribution indication parameter is set to 1. In contrast, in case the FILS access distribution indication parameter is set to 0, the terminal may not perform the access or may perform a backoff procedure based on the existing EDCA parameter set.

According to another embodiment of the present invention, an FILS backoff parameter may be determined depending on whether the STA is sensitive to delay. For example, the STA may be a delay sensitive STA that is sensitive to delay or a delay tolerant STA that is insensitive to delay depending on whether an application implemented in the STA is an application requiring real-time data. Whether the STA is sensitive to delay in transmitting and receiving data may be determined, e.g., depending on which one of active scanning and passive scanning is used as the STA's scanning scheme. In other words, the delay sensitive STA may perform initial access through active scanning, and the delay tolerant STA may perform initial access through passive scanning. The STA, if insensitive to delay like the delay tolerant STA as compared with the delay sensitive STA, may be controlled to access the medium with a lower priority than the delay sensitive STA in a backoff procedure when performing initial access. The scanning method is an exemplary criterion for distinguishing the delay sensitive STA from the delay tolerant STA, and whether the STA is the delay sensitive STA or delay tolerant STA may be distinguished by other schemes. According to an embodiment of the present invention, a method is disclosed in which access is distributed in a manner to reset the FILS backoff parameter with an STA performing passive scanning assumed to be a delay tolerant STA.

The STA may be aware of information on which one of active scanning and passive scanning is to be carried out based on the information on the scan type (ScanType information) included in the MLME-SCAN.request primitive. For example, the STA may access the medium by performing the existing backoff procedure in case the scan type included in the MLME-SCAN.request is ACTIVE. In contrast, in case the scan type included in the MLME-SCAN.request primitive is PASSIVE, the STA may access the medium by performing a backoff procedure based on the FILS backoff parameter transmitted from the AP. The FILS backoff parameter set in the STA performing passive scanning may also be referred to as a passive scanning FILS backoff parameter.

The following Table 5 shows exemplary passive scanning FILS backoff parameters according to an embodiment of the present invention.

TABLE 5

| CWmax | AIFSN | TXOP Limit |
|---|---|---|

Referring to Table 5, according to the present invention, the FILS backoff parameter for performing passive scanning might not contain a CWmin value unlike the existing FILS backoff parameter. Upon performing the conventional backoff procedure, the STA sets the CWmin value of a CW when initially attempting backoff to aCWmin. However, according to an embodiment of the present invention, the STA performing passive scanning may immediately set the CW value to CWmax upon attempting backoff. In other words, the initial access times of the terminals performing initial access may be distributed by expanding the CW of the STA performing passive scanning. In Table 5, use of only the CWmax value is an exemplary method for lowering the priority at which the STA accesses the medium by increasing the length of the CW of the STA performing passive scanning. Other value than aCWmin may be utilized as the CWmax value.

Figure 16:
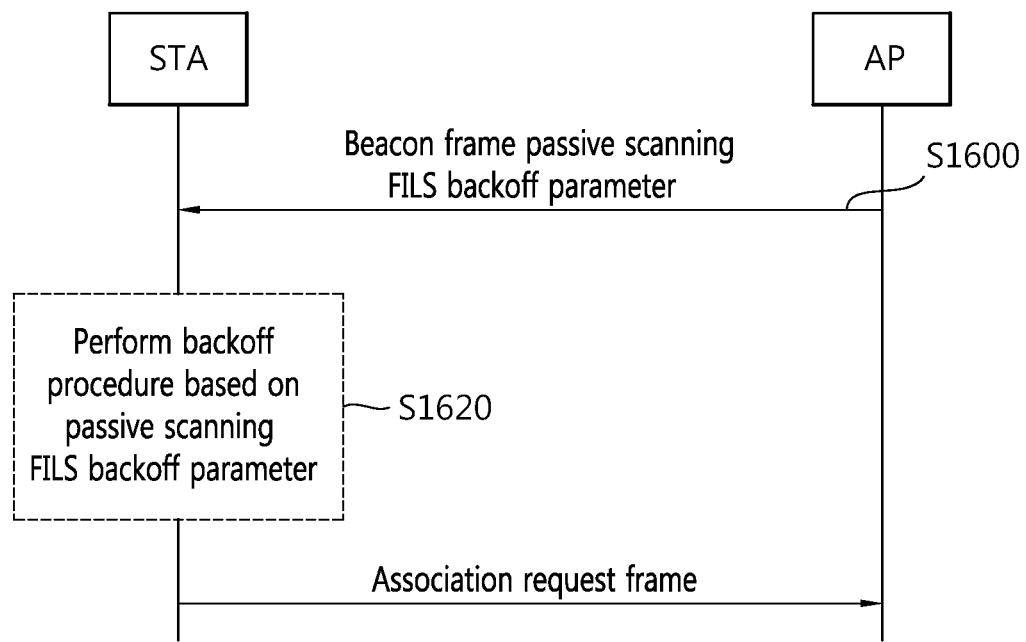
FIG. 16 is a concept view illustrating a method of transmitting a passive scanning FILS backoff parameter according to an embodiment of the present invention.

FIG. 16 is a concept view illustrating a method of transmitting a passive scanning FILS backoff parameter according to an embodiment of the present invention.

Referring to FIG. 16, the AP may include a passive scanning FILS backoff parameter in a frame for performing initial access and the AP may transmit the same to the STA (step S1600).

The AP may include the passive scanning FILS backoff parameter in a frame through which the STA may perform passive scanning, such as an FILS beacon frame or an unsolicited probe response frame, and the AP may transmit the same to the STA. The unsolicited probe response frame indicates a probe response frame transmitted from the AP to the STA in a broadcasting manner.

When receiving the frame containing the passive scanning FILS backoff parameter, the STA may perform a backoff procedure based on the passive scanning FILS backoff parameter (step S1620).

As described supra, in case the backoff procedure is performed based on Table 5, the STA performing passive scanning may select CWmax as a CW. Use of such method allows channel access of the STA performing passive scanning to be performed later than channel access of the STA performing active scanning.

Figure 17:
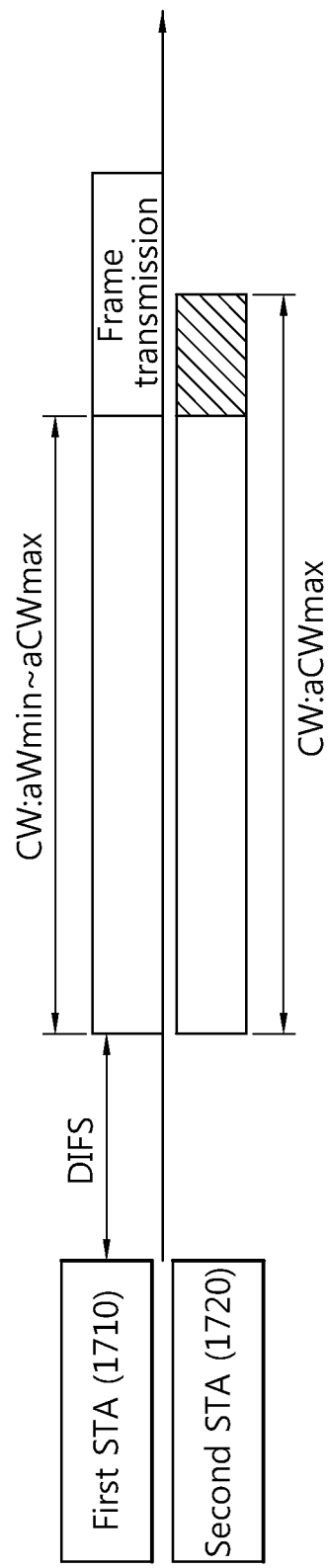
FIG. 17 is a concept view illustrating a backoff procedure of an STA performing passive scanning according to an embodiment of the present invention.

FIG. 17 is a concept view illustrating a backoff procedure of an STA performing passive scanning according to an embodiment of the present invention.

Referring to FIG. 17, assume that the first STA 1710 is an STA performing active scanning, and the second STA 1720 is an STA performing passive scanning. The first STA 1710 may select a CW between CWmin and CWmax. The second STA 1720 may select CWmax as a CW. In such case, since the CW of the first STA 1710 is smaller in size than the CW of the second STA 1720, the first STA may have priority over the second STA in accessing the medium.

According to another embodiment of the present invention, a backoff parameter relatively larger than the existing backoff parameter, rather than including the CWmin value, may be allocated to the STA performing passive scanning.

The following Table 6 shows a method of allocating a passive scanning FILS backoff parameter according to an embodiment of the present invention.

TABLE 6

| CWmin | CWmax | DIFS | TXOP Limit |
| --- | --- | --- | --- |

Referring to Table 6, a larger value than the existing backoff parameters, CWmin, CWmax, DIFS, and TXOP limit, may be used as a passive scanning FILS backoff parameter.

When utilizing such method, the STA performing active scanning has a smaller initial IFS than that of the STA performing passive scanning, and the STA performing active scanning may thus have priority over the STA performing passive scanning in accessing the medium. Since the size of CW increases as well, the STA performing active scanning may be set to have a higher priority.

According to another embodiment of the present invention, a backoff parameter that corresponds to N times as larger as the existing backoff parameter, rather than including the CWmin value, may be allocated. N may be delivered to the terminal through an FILS discovery frame or a beacon frame. The STA performing passive scanning may compute a value corresponding to N times as larger as the default backoff parameter based on the transmitted N value, and the STA may perform a backoff procedure for initial access.

The following Table 7 represents passive scanning FILS backoff parameters obtained by multiplying the backoff parameters by N.

TABLE 7

| CWmin | CWmax | AIFSN |
| --- | --- | --- |
| N * CWmin | N*CWmax | N * AIFSN |

Figure 18:
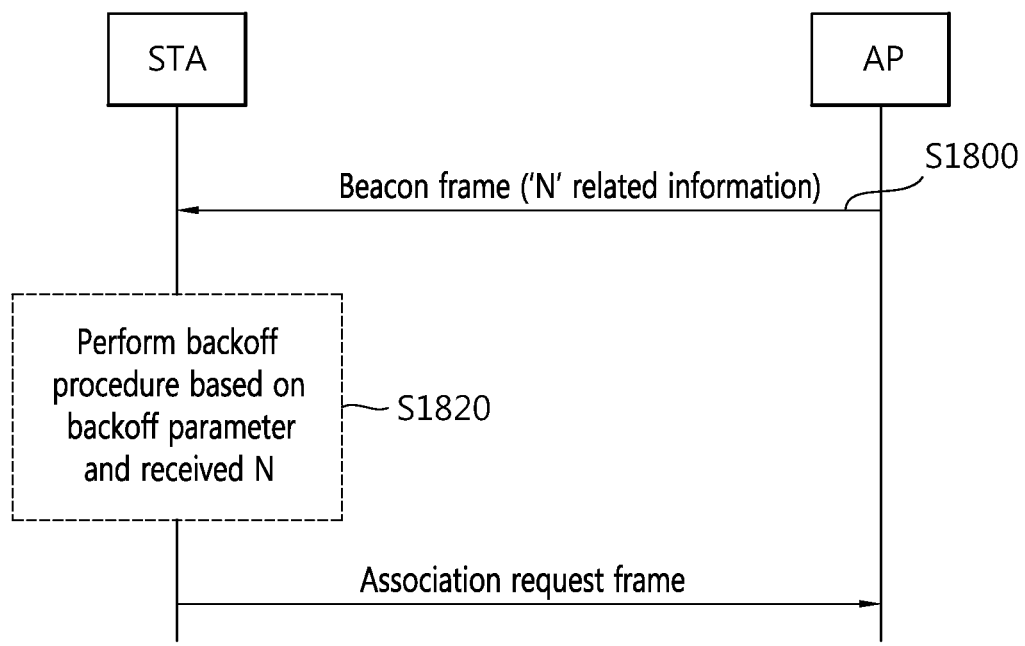
FIG. 18 is a concept view illustrating a backoff procedure based on an FILS backoff parameter according to an embodiment of the present invention.

FIG. 18 is a concept view illustrating a backoff procedure based on an FILS backoff parameter according to an embodiment of the present invention.

It may be assumed in FIG. 18 that the STA performing passive scanning transmits an association request frame after receiving a beacon frame.

The AP may transmit information on 'N' based on the beacon frame (step S1800).

The STA may receive the information on 'N' for multiplying the backoff parameter included in the beacon frame by N. The STA may multiply the values corresponding to the existing backoff parameters, CWmin, CWmax, and AIFSN, by N to compute the passive scanning FILS backoff parameters used for a backoff procedure for transmitting an association request frame to the AP.

According to another embodiment of the present invention, the passive scanning FILS backoff parameters corresponding to N times as large as the backoff parameters may be utilized depending on the data transmitted from the STA (step S1820).

As described above, the FILS backoff parameter may vary depending on the ACs which are classifications of traffic data transmitted from the terminal. Additionally, in case the STA is an STA performing passive scanning, the value obtained by multiplying the corresponding FILS backoff parameter by N may be used as the passive scanning FILS backoff parameter.

The following Table 8 represents passive scanning FILS backoff parameters obtained by multiplying the FILS backoff parameters by N.

TABLE 8

| AC | CWmin | CWmax | AIFS |
| --- | --- | --- | --- |
| AC_BK | N * aCWmin. | N * aCWmax | N * 7 |
| AC_BE | N * aCWmin. | N * aCWmax | N * 3 |
| AC_VI | N * ((aCWin + 1)/2 − 1) | N * aCWmin | N * 2 |
| AC_VO | N * ((aCWin + 1)/4 − 1) | N * ((aCWmin + 1)/2 − 1) | N * 2 |

The passive scanning FILS backoff parameters set forth herein may be dynamically varied depending on the load for performing access as measured by the AP. The dynamically varying passive scanning FILS backoff parameter may be may be included in an FILS beacon frame, beacon frame, or measurement pilot frame transmitted from the AP and may be transmitted, and may be thus dynamically varied.

Further, the initial access procedure based on the passive scanning FILS backoff parameter set forth herein may apply to all the management frames that are transmitted for the STA to perform initial access. Or, in case a first management frame is subjected to distribution, subsequent transmission frames may be considered to have already undergone the distribution. Accordingly, the initial access procedure may apply only to the first management frame that is transmitted for the STA to perform initial access after receiving a beacon frame.

Figure 19:
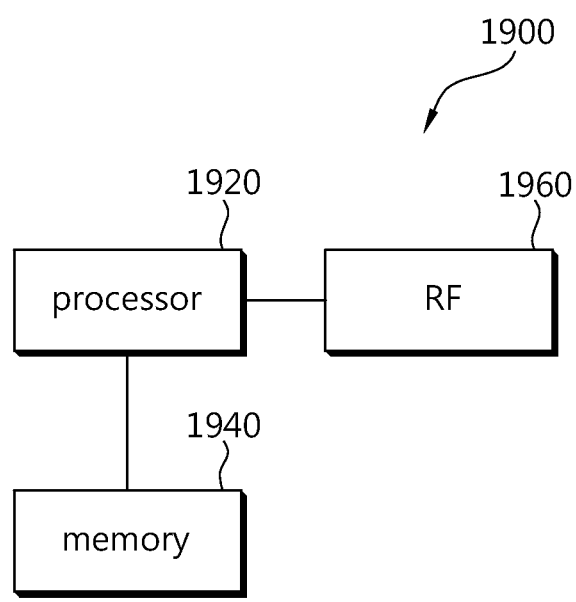
FIG. 19 is a block diagram illustrating a wireless device to which an embodiment of the present invention may apply.

FIG. 19 is a block diagram illustrating a wireless device to which an embodiment of the present invention may apply.

Referring to FIG. 19, the wireless device 1900 may be an STA that may implement the above-described embodiments, and the wireless device 1700 may be an AP or a non-AP STA (station).

The wireless device 1900 includes a processor 1920, a memory 1940, and an RF (Radio Frequency) unit 1960.

The RF unit 1960 may be connected with the processor 1920 to transmit/receive radio signals.

The processor 1920 implements functions, processes, and/or methods as proposed herein. For example, the processor 1920 may be implemented to perform the operation of the above-described wireless device according to an embodiment of the present invention.

For example, the processor 1920, in case the wireless device is an AP, may be implemented to transmit an FILS backoff parameter to an STA to control a backoff procedure of the STA.

Further, the processor 1920, in case the wireless device is an STA, may be implemented so that the STA receives an FILS (Fast Initial Link Setup) backoff parameter from an AP (Access Point) and the STA performs a backoff procedure using a final FILS backoff parameter determined based on the FILS backoff parameter and information on the access category of the data that the STA is to transmit.

The processor 1920 may include an ASIC (Application-Specific Integrated Circuit), other chipset, a logic circuit, a data processing device, and/or a converter that performs conversion between a baseband signal and a radio signal. The memory 1940 may include a ROM (Read-Only Memory), a RAM (Random Access Memory), a flash memory, a memory card, a storage medium, and/or other storage device. The RF unit 1960 may include one or more antennas that transmit and/or receive radio signals.

When an embodiment is implemented in software, the above-described schemes may be embodied in modules (processes, or functions, etc.) performing the above-described functions. The modules may be stored in the memory 1940 and may be executed by the processor 1920.

The memory 1940 may be positioned in or outside the processor 1920 and may be connected with the processor 1920 via various well-known means.

What is claimed is:

1. A method for performing an initial access of a station (STA), the method comprising:
   reporting, by the STA, information for determining a Fast Initial Link Setup (FILS) backoff parameter to an access point (AP), wherein the FILS backoff parameter is determined based on the information, and wherein the information includes an access category of a traffic data, backoff retry count information, packet retransmission count information and latest backoff interval information;
   receiving, by the STA, the FILS backoff parameter from the AP, wherein the FILS backoff parameter includes a size of a Contention Window (CW) and an Arbitration Inter-Frame Space Number (AIFSN), and
   performing, by the STA, a backoff procedure based on the size of the CW and the AIFSN determined by the information.

2. The method of claim 1,
   wherein the AIFSN and the size of the CW included in the FILS backoff parameter decrease when a priority of the access category increases.

3. The method of claim 1, further comprising:
   receiving, by the STA, an FILS access distribution indication parameter from the AP; and
   determining, based on the FILS access distribution indication parameter, whether the STA performs a backoff procedure based on a final FILS backoff parameter,
   wherein the FILS access distribution indication parameter includes information on whether the STA performs the backoff procedure based on the final FILS backoff parameter.

4. The method of claim 3,
   wherein determining, based on the FILS access distribution indication parameter, whether the STA performs a backoff procedure based on the final FILS backoff parameter includes:
   when the FILS access distribution indication parameter is 1, performing, by the STA, the backoff procedure based on the final FILS backoff parameter; and
   when the FILS access distribution indication parameter is 0, performing, by the STA, the backoff procedure based on a default backoff parameter.

5. A station (STA) of a wireless LAN system, the STA comprising:
   a radio frequency (RF) unit receiving a radio signal; and
   a processor operatively connected with the RF unit that:
   reports information for determining a Fast Initial Link Setup (FILS) backoff parameter to an Access Point (AP), wherein the FILS backoff parameter is determined based on the information, and wherein the information includes an access category of a traffic data, backoff retry count information, packet retransmission count information and latest backoff interval information;
   controls the RF unit to receive the FILS backoff parameter from the AP, wherein the FILS backoff parameter includes a size of a Contention Window (CW) and an Arbitration Inter-Frame Space Number (AIFSN), and
   performs a backoff procedure based on the size of the CW and the AIFSN determined by the information.

6. The STA of claim 5,
   wherein the AIFSN and the size of the CW included in the FILS backoff parameter decrease when a priority of the access category increases.

7. The STA of claim 5,
   wherein the processor:
   controls the RF unit to receive, by the STA, an FILS access distribution indication parameter from the AP, and
   determines, based on the FILS access distribution indication parameter, whether the STA performs a backoff procedure based on a final FILS backoff parameter,
   wherein the FILS access distribution indication parameter includes information on whether the STA performs the backoff procedure based on the final FILS backoff parameter.

8. The STA of claim 7,
   wherein the processor:
   performs, when the FILS access distribution indication parameter is 1, the backoff procedure based on the final FILS backoff parameter and,
   performs, when the FILS access distribution indication parameter is 0, the backoff procedure based on a default backoff parameter.

* * * * *